US009667501B2

(12) United States Patent
Dasgupta et al.

(10) Patent No.: US 9,667,501 B2
(45) Date of Patent: May 30, 2017

(54) PRE-PROCESSING FRAMEWORK COMPONENT OF DISTRIBUTED INTELLIGENCE ARCHITECTURES

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR); Grégory Mermoud, Veyras (CH)

(73) Assignee: Cisco Technology, Inc., San Jose, CA (US)

(*) Notice: Subject to any disclaimer, the term of this patent is extended or adjusted under 35 U.S.C. 154(b) by 497 days.

(21) Appl. No.: 13/953,113

(22) Filed: Jul. 29, 2013

(65) Prior Publication Data

US 2014/0222729 A1    Aug. 7, 2014

Related U.S. Application Data

(60) Provisional application No. 61/761,124, filed on Feb. 5, 2013.

(51) Int. Cl.
*H04L 12/24* (2006.01)
*G06N 99/00* (2010.01)
*H04L 29/06* (2006.01)

(52) U.S. Cl.
CPC ........... *H04L 41/14* (2013.01); *G06N 99/005* (2013.01); *H04L 41/065* (2013.01);
(Continued)

(58) Field of Classification Search
CPC ... H04L 41/0681; H04L 41/065; H04L 41/14; H04L 63/1425; H04L 41/5035; H04L 65/40; H04L 51/5016
See application file for complete search history.

(56) References Cited

U.S. PATENT DOCUMENTS 5,838,915 A * 11/1998 Klausmeier ............. H04L 47/10
  370/412
6,691,250 B1 * 2/2004 Chandiramani ...... G06F 11/079
  714/15

(Continued)

OTHER PUBLICATIONS

Dasgupta, et al., "A Pre-Processing Framework Component of Distributed Intelligence Architectures", U.S. Appl. No. 61/761,124, filed Feb. 5, 2013, 30 pages, U.S. Patent and Trademark Office.

(Continued)

*Primary Examiner* — Jimmy H Tran
(74) *Attorney, Agent, or Firm* — Parker Ibrahim & Berg LLC; James M. Behmke; Stephen D. LeBarron (57) ABSTRACT

In one embodiment, a state tracking engine (STE) defines one or more classes of elements that can be tracked in a network. A set of elements to track is determined from the one or more classes, and the set of elements is tracked in the network. Access to the tracked set of elements then provided via one or more corresponding application programming interfaces (APIs). In another embodiment, a metric computation engine (MCE) defines one or more network metrics to be tracked in the network. One or more tracked elements are received from the STE. The one or more network metrics are tracked in the network based on the received one or more tracked elements. Access to the tracked network metrics is then provided via one or more corresponding APIs.

22 Claims, 10 Drawing Sheets

(52) U.S. Cl.
CPC ...... *H04L 41/5016* (2013.01); *H04L 41/5035* (2013.01); *H04L 63/1425* (2013.01); *H04L 65/40* (2013.01)

(56) References Cited

U.S. PATENT DOCUMENTS

| | | | | |
|---|---|---|---|---|
| 7,082,604 | B2* | 7/2006 | Schneiderman | G06F 9/4862 709/202 |
| 7,197,366 | B2* | 3/2007 | Bodin | H04L 12/2805 600/301 |
| 7,428,214 | B2* | 9/2008 | Nosella | H04L 1/22 370/216 |
| 7,457,315 | B1* | 11/2008 | Smith | G10L 19/012 370/473 |
| 7,478,156 | B1* | 1/2009 | Pereira | H04L 43/026 709/224 |
| 7,577,736 | B1* | 8/2009 | Ovenden | H04L 12/14 370/229 |
| 7,814,201 | B2* | 10/2010 | Maiocco | H04L 43/08 370/252 |
| 7,860,965 | B1* | 12/2010 | Bain | H04L 12/2602 709/223 |
| 7,870,547 | B2* | 1/2011 | Schuft | G06F 8/65 717/126 |
| 8,005,009 | B2* | 8/2011 | McKee | H04L 43/022 370/230.1 |
| 8,027,261 | B2* | 9/2011 | Charzinski | H04L 41/5009 370/238 |
| 8,045,474 | B2* | 10/2011 | Samprathi | H04L 43/0817 370/241 |
| 8,185,619 | B1* | 5/2012 | Maiocco | H04L 12/6418 709/203 |
| 8,228,954 | B2* | 7/2012 | Thubert | H04W 40/246 370/328 |
| 8,769,088 | B2* | 7/2014 | Campbell | H04L 41/04 709/224 |
| 8,935,381 | B2* | 1/2015 | Kalavade | G06Q 10/0637 705/7.29 |
| 9,229,800 | B2* | 1/2016 | Jain | G06Q 30/01 |
| 9,231,903 | B2* | 1/2016 | Seastrom | H04L 61/1511 |
| 9,262,253 | B2* | 2/2016 | Jain | G06F 11/0736 |
| 9,325,748 | B2* | 4/2016 | Jain | H04L 41/5035 |
| 2001/0052016 | A1* | 12/2001 | Skene | G06F 9/505 709/226 |
| 2002/0156932 | A1* | 10/2002 | Schneiderman | G06F 9/4862 719/317 |
| 2003/0033394 | A1* | 2/2003 | Stine | H04L 12/5695 709/222 |
| 2004/0230645 | A1* | 11/2004 | Bodin | H04L 12/2805 709/202 |
| 2004/0249826 | A1* | 12/2004 | Bodin | H04L 12/2803 |
| 2005/0027837 | A1* | 2/2005 | Roese | H04L 41/0893 709/223 |
| 2005/0076054 | A1* | 4/2005 | Moon | H04L 67/12 |
| 2006/0075093 | A1* | 4/2006 | Frattura | H04L 41/0681 709/224 |
| 2006/0218447 | A1* | 9/2006 | Garcia | H04L 43/087 714/39 |
| 2006/0294215 | A1* | 12/2006 | Noble | H04L 67/12 709/223 |
| 2007/0055789 | A1* | 3/2007 | Claise | H04L 47/10 709/234 |
| 2007/0086336 | A1* | 4/2007 | Richards | C07F 17/00 370/229 |
| 2007/0288493 | A1* | 12/2007 | Bodin | H04L 12/2803 |
| 2009/0013070 | A1* | 1/2009 | Srivastava | H04L 43/12 709/224 |
| 2009/0122797 | A1* | 5/2009 | Thubert | H04W 40/246 370/392 |
| 2009/0138447 | A1* | 5/2009 | Kalavade | G06Q 10/0637 |
| 2009/0245122 | A1* | 10/2009 | Maiocco | H04L 43/08 370/252 |
| 2010/0002586 | A1* | 1/2010 | Charzinski | H04L 41/5009 370/238 |
| 2010/0306368 | A1* | 12/2010 | Gagliardi | H04L 43/045 709/224 |
| 2011/0078227 | A1* | 3/2011 | McAloon | G06F 11/3006 709/201 |
| 2011/0276679 | A1* | 11/2011 | Newton | H04N 21/23103 709/224 |
| 2012/0159459 | A1* | 6/2012 | Turner | G06F 8/314 717/138 |
| 2012/0185582 | A1* | 7/2012 | Graessley | H04L 61/6086 709/224 |
| 2012/0198346 | A1* | 8/2012 | Clemm | H04L 43/0829 715/736 |
| 2013/0024560 | A1* | 1/2013 | Vasseur | H04L 41/142 709/224 |
| 2014/0222996 | A1* | 8/2014 | Vasseur | H04L 41/16 709/224 |
| 2014/0222998 | A1* | 8/2014 | Vasseur | H04L 41/16 709/224 |

OTHER PUBLICATIONS

Vasseur, et al., "Dynamically Adjusting a set of Monitored Network Properties Using Distributed Learning Machine Feedback", U.S. Appl. No. 61/761,118, filed Feb. 5, 2013, 24 pages, U.S. Patent and Trademark Office.

Winter, et al., "RPL: IPv6 Routing Protocol for Low-Power and Lossy Networks", Request for Comments 6550, Mar. 2012, 157 pages, Internet Engineering Task Force Trust.

* cited by examiner

PRE-PROCESSING FRAMEWORK COMPONENT OF DISTRIBUTED INTELLIGENCE ARCHITECTURES

RELATED APPLICATION

The present invention claims priority to U.S. Provisional Application Ser. No. 61/761,124, filed Feb. 5, 2013, entitled "PRE-PROCESSING FRAMEWORK COMPONENT OF DISTRIBUTED INTELLIGENCE ARCHITECTURES", by Dasgupta, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, techniques are shown and described relating to a pre-processing framework component of distributed intelligence architectures. In one embodiment, a state tracking engine (STE) defines one or more classes of elements that can be tracked in a network. A set of elements to track is determined from the one or more classes, and the set of elements is tracked in the network. Access to the tracked set of elements then provided via one or more corresponding application programming interfaces (APIs). In another embodiment, a metric computation engine (MCE) defines one or more network metrics to be tracked in the network. One or more tracked elements are received from the STE. The one or more network metrics are tracked in the network based on the received one or more tracked elements. Access to the tracked network metrics is then provided via one or more corresponding APIs.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
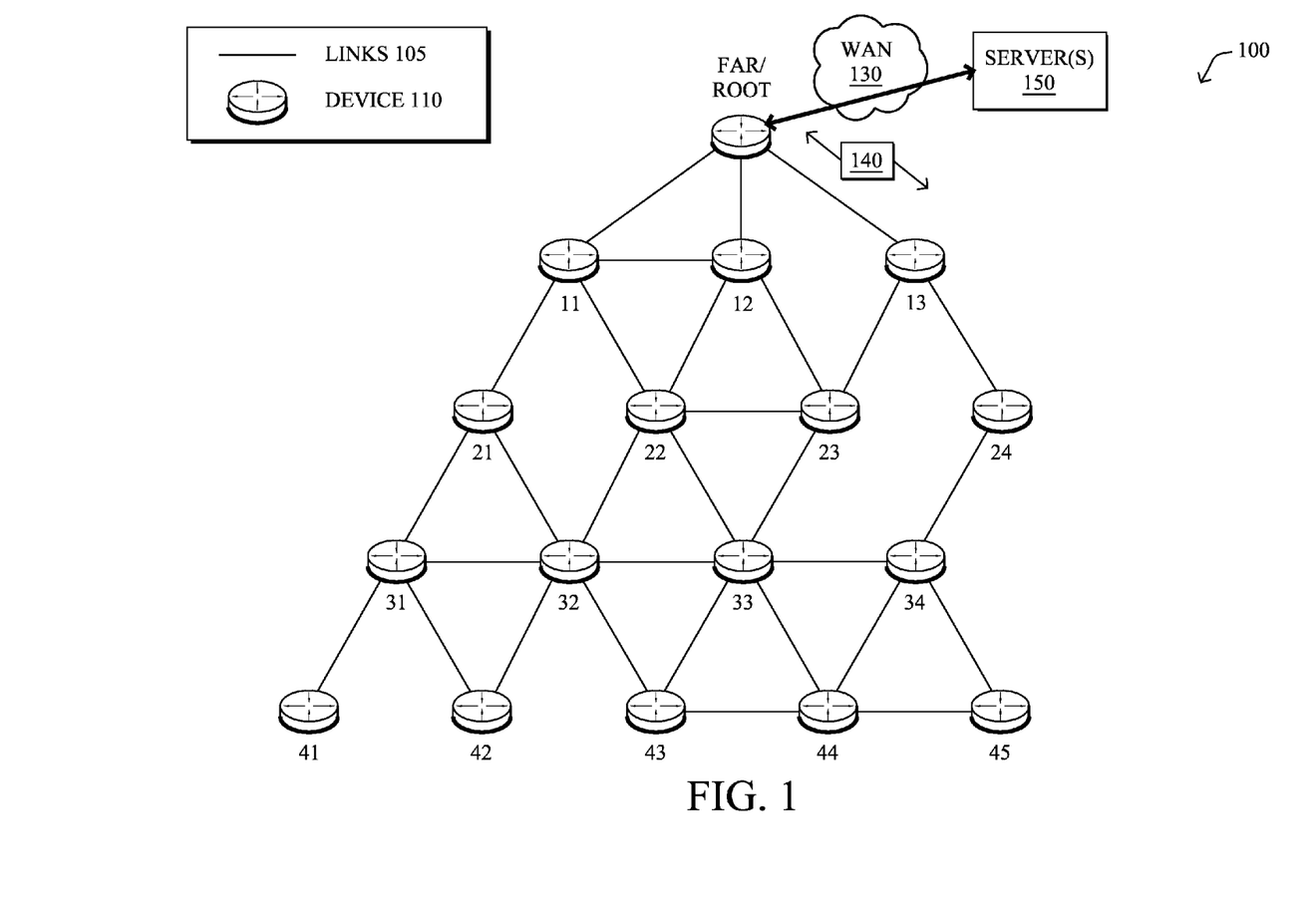
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
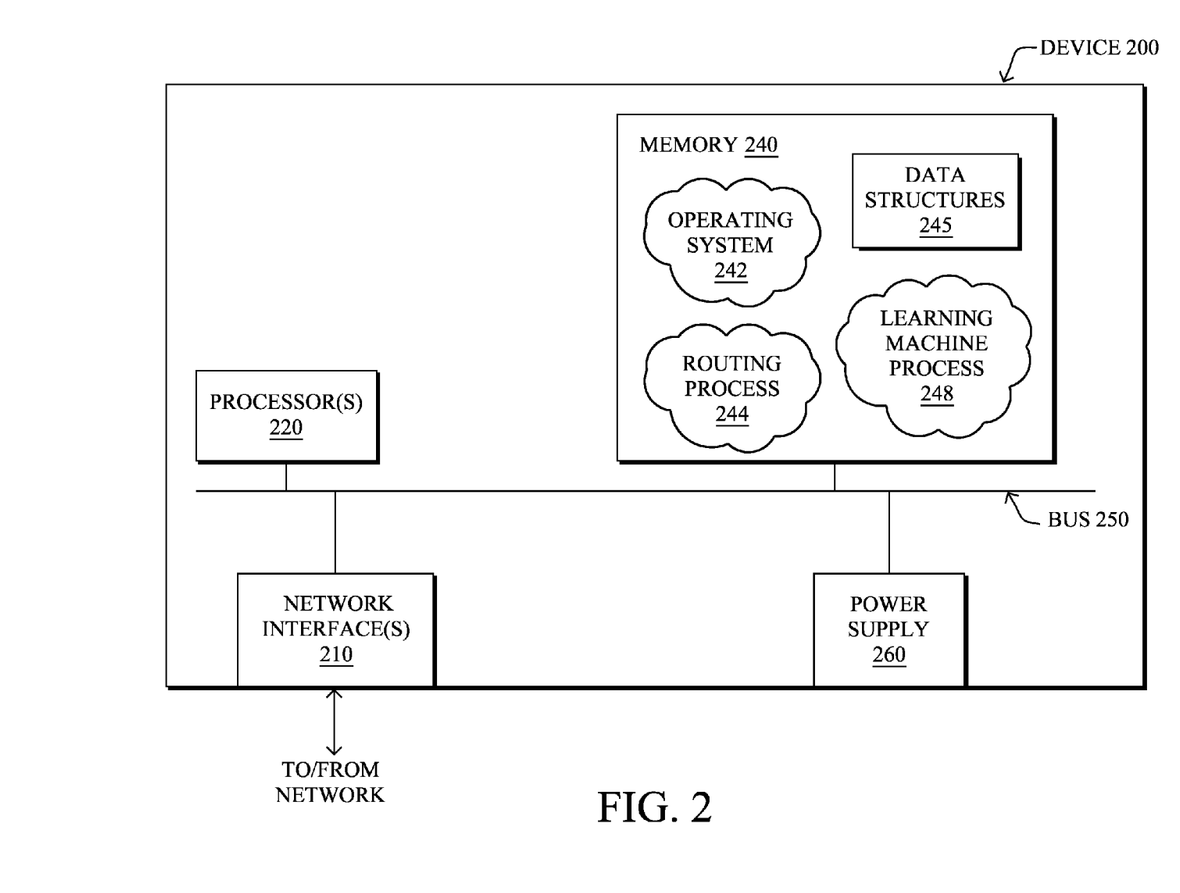
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
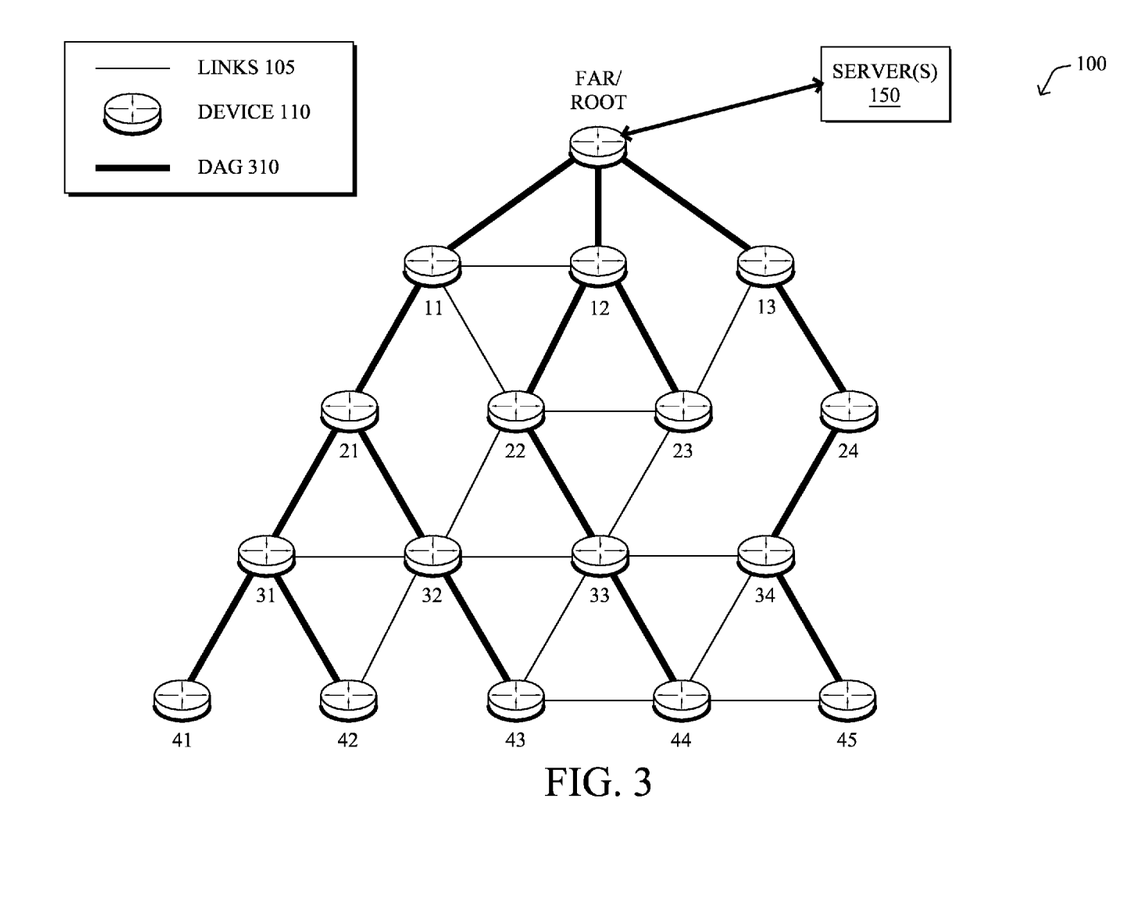
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

With the concept of distributed intelligence gaining tremendous traction (using for example a variety of Learning Machine based algorithms), there is a lack of several key elements in the architecture in current networks that would allow the deployment of these mechanisms rapidly. One of the key components of an intelligent mechanism relates to data gathering at the right place in the network: the ability to track all details of the states of a system and compute performance metrics that can determine how the system is behaving.

According to the techniques herein, an architecture is described for gathering states that consists of a few components that together allow a user to capture as much detail as possible about the state of the network. The model is flexible so that the user is not tied to how they would like to use this information and it is completely up to them to design their distributed intelligence solution. One goal of the techniques herein is to empower the customer with powerful tools that will allow the creation of their own intelligent mechanisms. Note that in contrast with existing data gathering systems, the proposed approach allows for pre-processing of network-related information that is then consumed by networking or application layers (e.g., Learning Machines) in a distributed fashion.

In one embodiment, a state tracking engine (STE) defines one or more classes of elements that can be tracked in a network. A set of elements to track is determined from the one or more classes, and the set of elements is tracked in the network. Access to the tracked set of elements then provided via one or more corresponding application programming interfaces (APIs). In another embodiment, a metric computation engine (MCE) defines one or more network metrics to be tracked in the network. One or more tracked elements are received from the STE. The one or more network metrics are tracked in the network based on the received one or more tracked elements. Access to the tracked network metrics is then provided via one or more corresponding APIs.

Said differently, the techniques herein propose a dynamic pre-processing architecture for the deployment of distributed intelligence mechanisms in constrained environments. One goal is to provide interfaces and information gathering mechanisms that will be the building blocks for closed loop solutions. In particular, the development and availability of this architecture is also highly customizable and configurable for any entity to use through the introduction of several components. First, the State Tracking Engine (STE) provides a repository of generic types of states that can be tracked, and also provides a mechanism to identify new characteristics to be tracked. The STE can also be configured by the Learning Machine (LM) or the NMS to track only specific characteristics. Second, the Metric Computation Engine (MCE) provides a mechanism to develop one's own metrics and track them based on the states tracked by the STE. Using these components together allows a rich set of mechanisms to be deployed according to specific use cases.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

As mentioned above, as LLNs become dense, heterogeneous, and dynamic, there is an increasing number of real time and/or new behavioral metrics that would need to be tracked and consumed by intelligent agents such as Learning Machines either for performance analysis or introduction of closed loop mechanisms for dynamic network control. Both of these requirements will need the ability to access easily an engine that tracks all the dynamics as LLNs evolve. Note that these metrics are in general not available without a pre-processing layer. The techniques herein thus pre-process information to be consumed by other processes that are not currently available. (Note that retrieving data natively (without pre-processing) would be exaggeratedly costly.)

Figure 4:
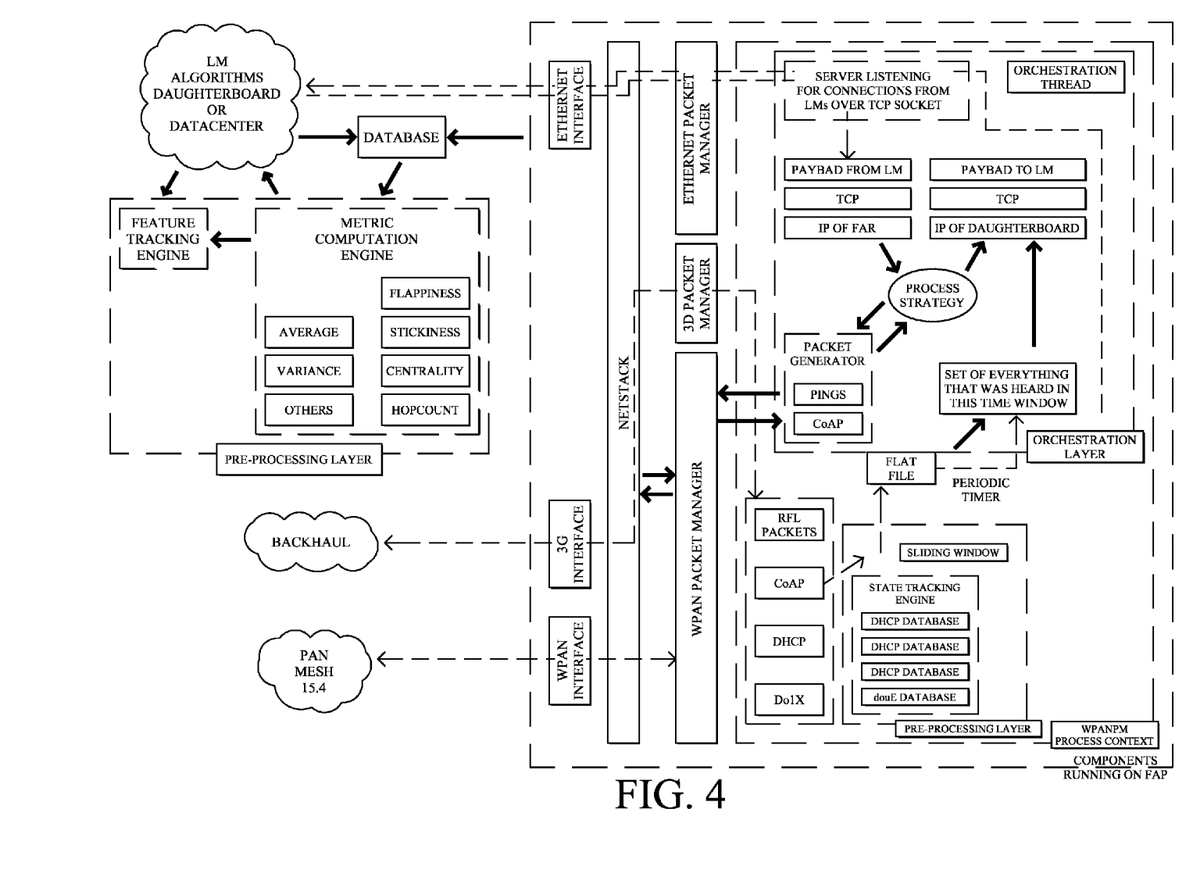
FIG. 4 illustrates an example pre-processing framework architecture.

Operationally, the techniques herein introduce a lightweight processing-layer that allows a user or networking application such as a LM (customer or vendor) to track, in real time, key performance metrics in LLNs. FIG. 4 shows the overview schematic for a clearer understanding.

A first component of the embodiments herein is the State Tracking Engine (STE). This is a newly defined engine that resides within the router and will be responsible for tracking system states (such as topology, traffic profiles, etc.) as well as control traffic (routing packets, DHCP, Dot1x, etc.) and application traffic properties, keeping in mind privacy and security concerns. A class of elements is defined to organize the type of properties that can be tracked. For example, the different classes can be: Routing, Application, Security, Link Layer, etc. These classes can then further contain individual properties that can be tracked. For example, class "Routing" could contain: {type of protocol, type of packet, traffic statistics, IP addresses, TLVs, flags, etc.}. Similarly, there will be elements in class "Application" such as {Port numbers, traffic statistics, transport protocol used, etc.}. All class elements will have standard APIs for accessing their values.

Another aspect of the STE is to track properties aside from the generic classes defined above. If the STE observes something that it cannot categorize into the above classes or one of the elements of the above classes, it may enquire the user to classify the property for it and then accordingly will generate APIs dynamically to track it.

In another embodiment, the STE is completely configurable with respect to which elements and classes should be tracked. In its default configuration, all elements of all classes will be tracked. Subsequently, the NMS and/or the LM algorithm will realize that all the information is not required (for example using mechanisms such as described in U.S. Provisional Patent Application Ser. No. 61/761,118, entitled "Dynamically Adjusting a Set of Monitored Network Properties Using Distributed Learning Machine Feedback", filed by Vasseur et al. on Feb. 5, 2013). The NMS or the LM algorithm will then proceed to configure the STE to track only certain elements selectively. This will also be helpful for highly constrained devices that will not have the resources to track everything. To that end, the techniques herein define a IPv6 message called an "STE_track" message used by the NMS to enforce the set of states that must be computed and/or tracked by the STE, considering which states are irrelevant (in architectures where the STE performs the required analytics for determining which features are relevant) but also policy consideration.

In another, distributed embodiment (see FIG. 5), the STE may span the whole PAN, by endowing the end nodes with minimal STE instances. The node-based STE instances are then responsible for collecting the required information locally, and pushing it upstream at regular, configurable time intervals. This approach is an architecturally clean way of handling data collection within the PAN. Currently, data are piggybacked in control plane messages (e.g., RPL DAO packets) or explicitly sent by individual nodes through CoAP packets. Another critical advantage of the techniques herein is the drastic reduction in bandwidth and computation by performing tasks such as data aggregation automatically and transparently from the user standpoint. As an example, if one of the properties of interest is the average ETX of a set of node S, the STE may use a novel multicast message asking each node of S to locally transmit its ETX value to its parent. Each node would then aggregate the values reported by its children into a single data structure (a pair composed of the mean ETX and the number of children), and pass it along to its parent, which would proceed similarly.

Figure 5:
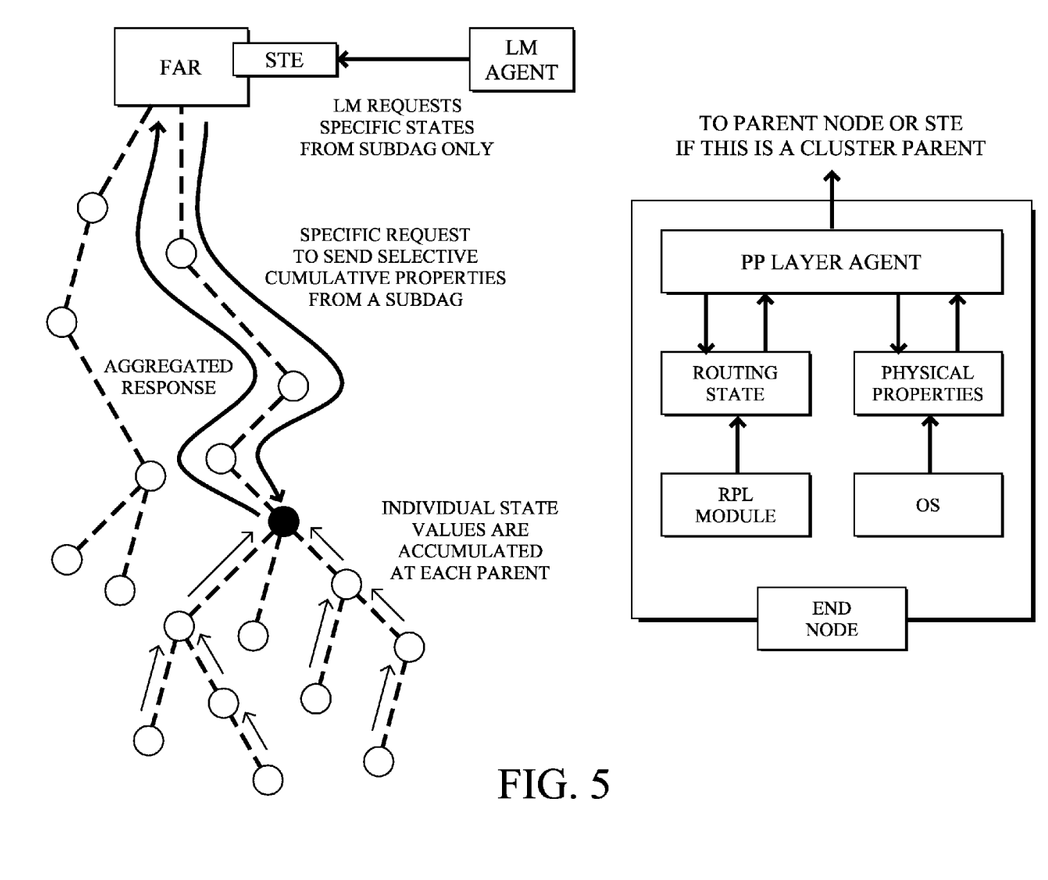
FIG. 5 illustrates an example network with a distributed STE embodiment.

The current, suboptimal approach consists of using unicast messages to query each node $n_i$ for its ETX value and then perform the computation centrally. The "query & reduce" approach herein, however, allows for a dramatic reduction in bandwidth usage and it leverages the computational power available in the edge of the network. The user may specify arbitrary aggregation operators by specifying an aggregate( ) function. The function aggregate (vi, list (sc))→sp takes the value vi of the node $n_i$ as well as the list of values returned by its children as input, and returns an aggregated value vp to be transmitted to its parent. Note that vi is typically a scalar or vector value (i.e., a node property or metric) whereas sc and sp may range from pairs (when aggregate( ) is a mere averaging) to more complex data structures (when aggregate( ) is a more fine-grained operator). Another critical feature of the distributed STE is that node-based instances can perform averaging in time locally, and transmit only a single time-averaged value at a low rate instead of multiple sequential values at a high rate. Of course, this feature requires some local caching at the node level.

As the volume of information that is captured by the STE can quickly grow very large based on how much information is being requested, gathered information is periodically pushed into a remote (or local) data-store.

Note that several mechanisms can be used to transfer the data to the datastore. FIG. 5 above shows one illustrative mechanism. All the data gathered about the state of the elements (e.g., RPL packets, node parents, etc.) are periodically pushed to a file that is then offloaded to a remote server over a socket. On the other side of the socket, the contents are moved into a database such that history of all data is available to any LM algorithm that wishes to access it.

Figure 6:
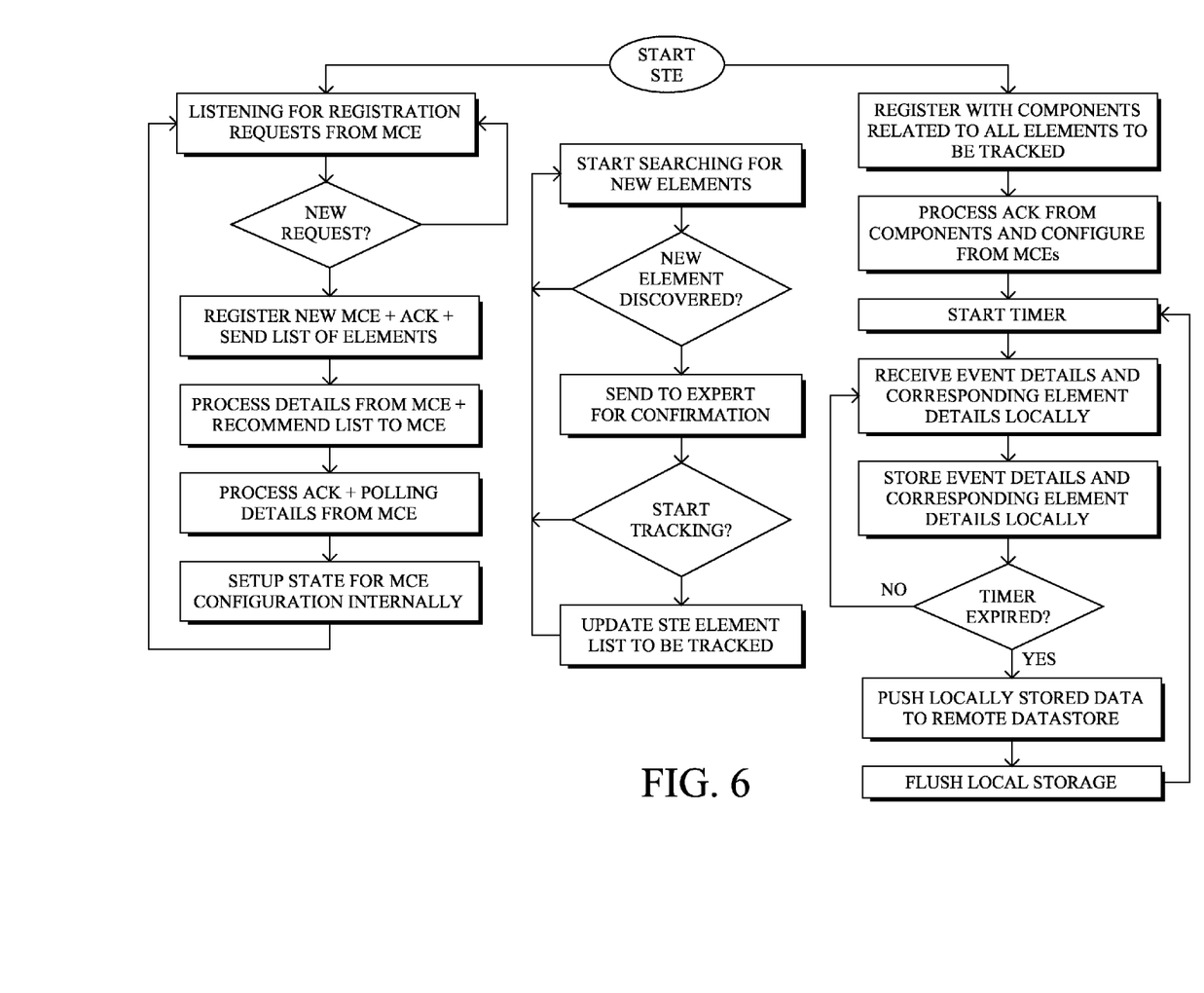
FIG. 6 illustrates an example flow of STE functionality.

FIG. 6 shows the flow of STE functionality once it starts.

A second component of the embodiments herein is called the Metric Computation Engine (MCE). The main responsibility of the MCE is to give the ability to the user to create their own performance metric and track them from a running system. For functioning, the MCE provides some default generic variables such as time, number, rate, etc. and statistical functions such as average, variance, frequency, etc. These variables coupled this with the classes and their elements provided by the STE will allow the creation of newly defined and customized metrics of choice.

For example, the computation of two metrics are herein illustrated: flappiness and stickiness of nodes. These are not obvious performance metrics and would need to be thought off only after observing the LLN behavior and then designed to quantify the observed behavior.

The flappiness F(n) of a node n is the rate at which n changes its preferred parent. For a sequence of RPL tree snapshots $[T_1, \ldots, T_{N\_snapshots}]$, F(n) is computed as the number of snapshots $T_i$ such that n has a different parent in $T_i$ and $T_{i-1}$, divided by the total number of snapshots N_snapshots, minus one:

$$\mathcal{F}(N) = \frac{\sum_{i=2}^{N_{snapshots}} 1_{\{parent(n,T_i) \neq parent(n,T_{i-1})\}}}{N_{snapshots} - 1} \quad \text{(EQ. 1)}$$

where parent(n,T) denotes the parent of n in snapshot T and $1_{\{cond\}}$ is an indicator function (i.e., it equals one if cond is true, and zero otherwise).

Interpretation: The flappiness is a direct measure of the stability of the routing tree with respect to a given node. In particular, it measures the probability that the node changes its preferred parent in the next snapshot. Note however a node can be very "flappy" while preserving a low -stickiness- and -diversity- or maintaining the same -hop count-.

The stickiness S(n) is the proportion of snapshots in which the preferred parent of n matches its most frequent parent. In other words, if $C_i$ is the number of snapshots in which $n_i$ is the preferred parent of n, then:

$$S(n) = \frac{\max([c_1, \ldots, c_{N_{nodes}}])}{N_{snapshots}} \quad \text{(EQ. 2)}$$

Interpretation: The stickiness describes the behavior of a node when it becomes flappy. Indeed, if a node has a flappiness of zero, then its stickiness is one by definition. However, as its flappiness increases, a node may still "stick" to one parent for most of the time, while going back and forth to other parents for short periods, thereby conserving a low stickiness. As a result, the stickiness provides a notion of the variability of the routing topology in -time-.

Several such metrics can be computed and the above are only two such examples for clarification.

When new types of nodes, or new applications are introduced in the network, certain dynamics could arise that have never been seen before and could be subtle. The goal of the MCE is to make it easy for the system to capture these kinds of dynamics using custom metrics.

Figure 7:
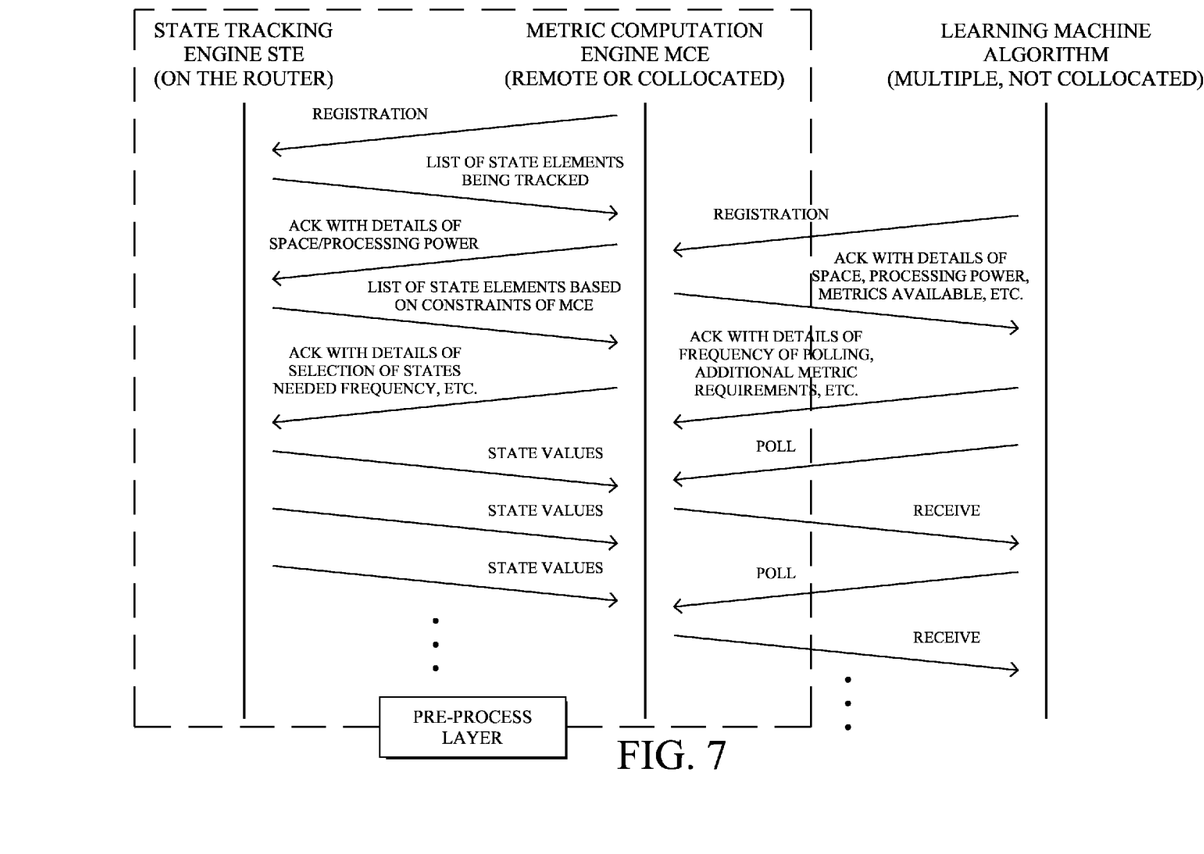
FIG. 7 illustrates an example sequence of messages exchanged between the STE and MCE as well as the MCE and the LM.

New APIs are generated on the fly corresponding to these metrics. It should also be noted, that the metrics themselves can be coupled with all the variables provided by the MCE and classes/elements provided by the STE to generate more sophisticated metrics. Similar to above, these metrics can be stored periodically to a data-store and the user can gather whatever range/set of values of interest they find. FIG. 7 shows the sequence of messages exchanged between the STE and MCE as well as the MCE and the LM. All communication may illustratively take place over TCP based sockets to ensure reliability.

Figure 8:
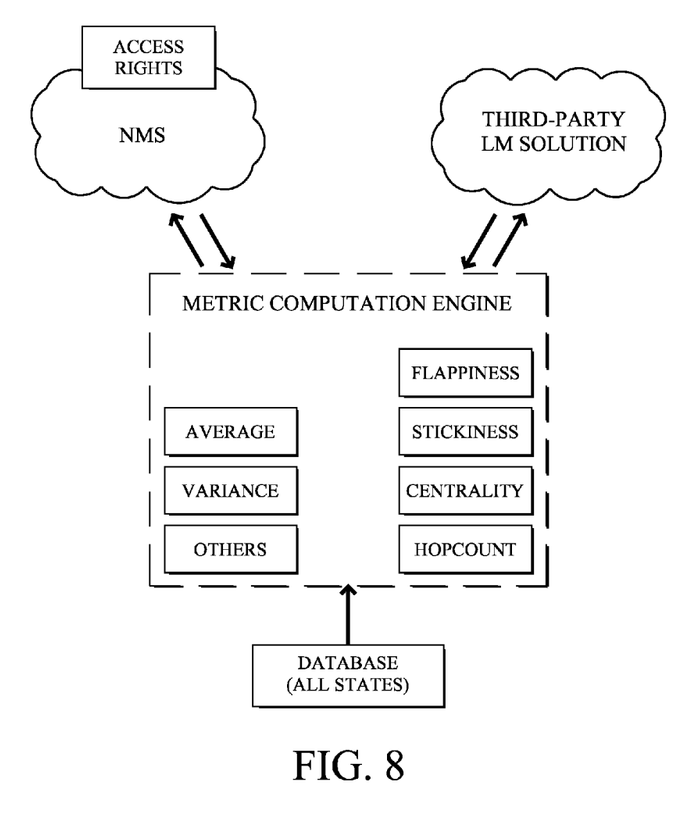
FIG. 8 illustrates an example of managing information rights.

An important aspect of the MCE is also a policy based access control mechanism. Since the MCE is part of a generic framework that will be potentially made available to any distributed intelligence solution, it is imperative to put in place information rights. FIG. 8 illustrates one manner in which this may be implemented. The NMS keeps track of all the states that are of high value from a privacy and security standpoint and will make sure that the MCE does not give access to them unless it is a certified and authenticated LM agent. There will be some states (such as number of different applications, number of nodes, FARs etc.) that will be shareable from a sensitivity standpoint and should not require any access control.

Figure 9:
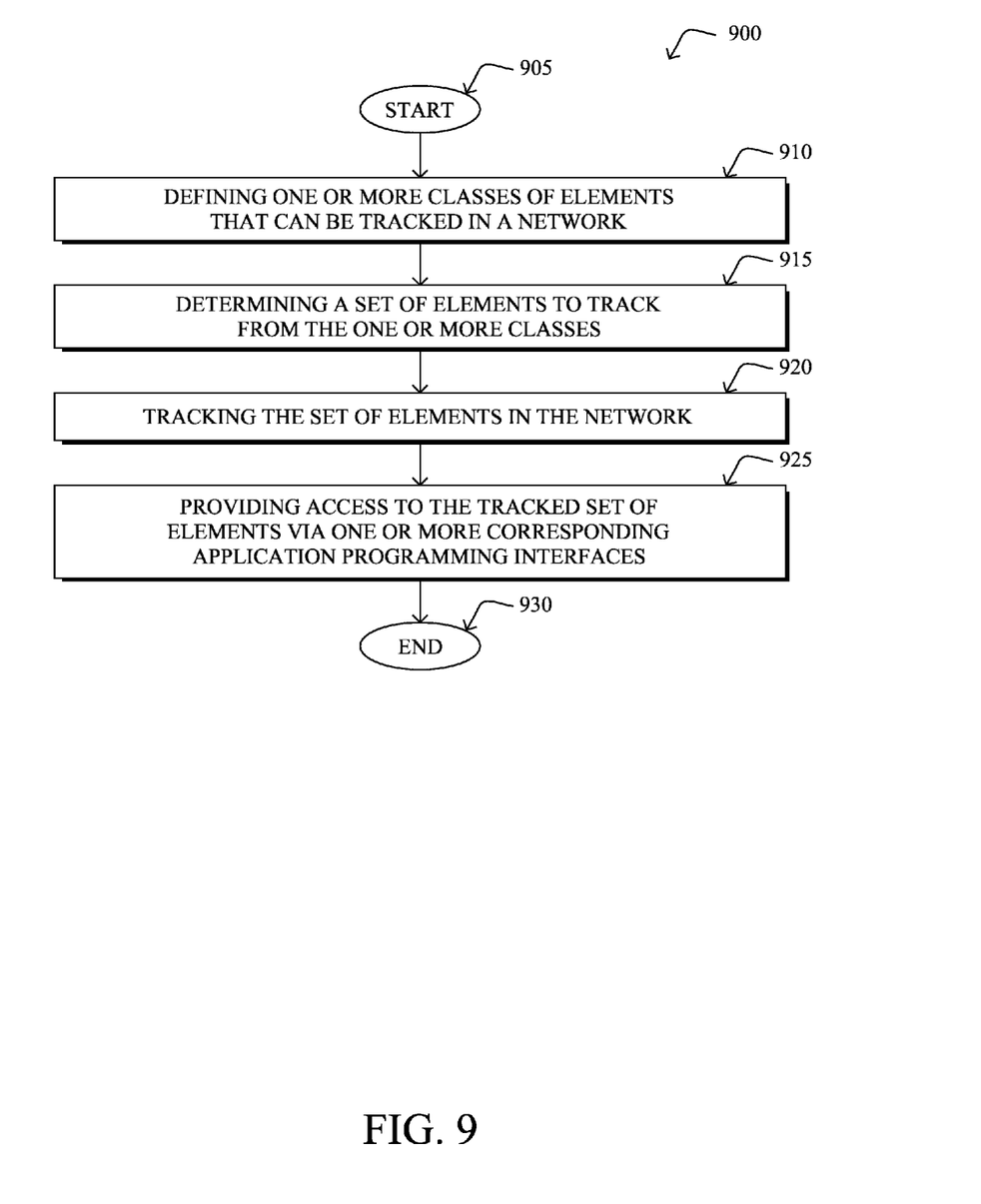
FIG. 9 illustrates an example simplified procedure for an STE as a pre-processing framework component of distributed intelligence architectures.

FIG. 9 illustrates an example simplified procedure for an STE as a pre-processing framework component of distributed intelligence architectures. As shown in FIG. 9, the procedure 900 may start at step 905, continue to step 910, and so forth, where, as described in greater detail above, an STE defines classes of elements and tracks the defined elements in the network.

At Step 910, the procedure 900 includes defining one or more classes of elements that can be tracked in a network. The elements relating to one or more of: system states, control traffic properties, and application traffic properties. At Step 915, a set of elements to track is determined from the one or more classes. At Step 920, the set of elements is tracked in the network. At Step 925, access to the tracked set of elements then provided via one or more corresponding application programming interfaces (APIs). The procedure 900 illustratively ends at Step 930. The techniques by which the steps of procedure 900 are performed, as well as ancillary procedures, are described in detail above.

Figure 10:
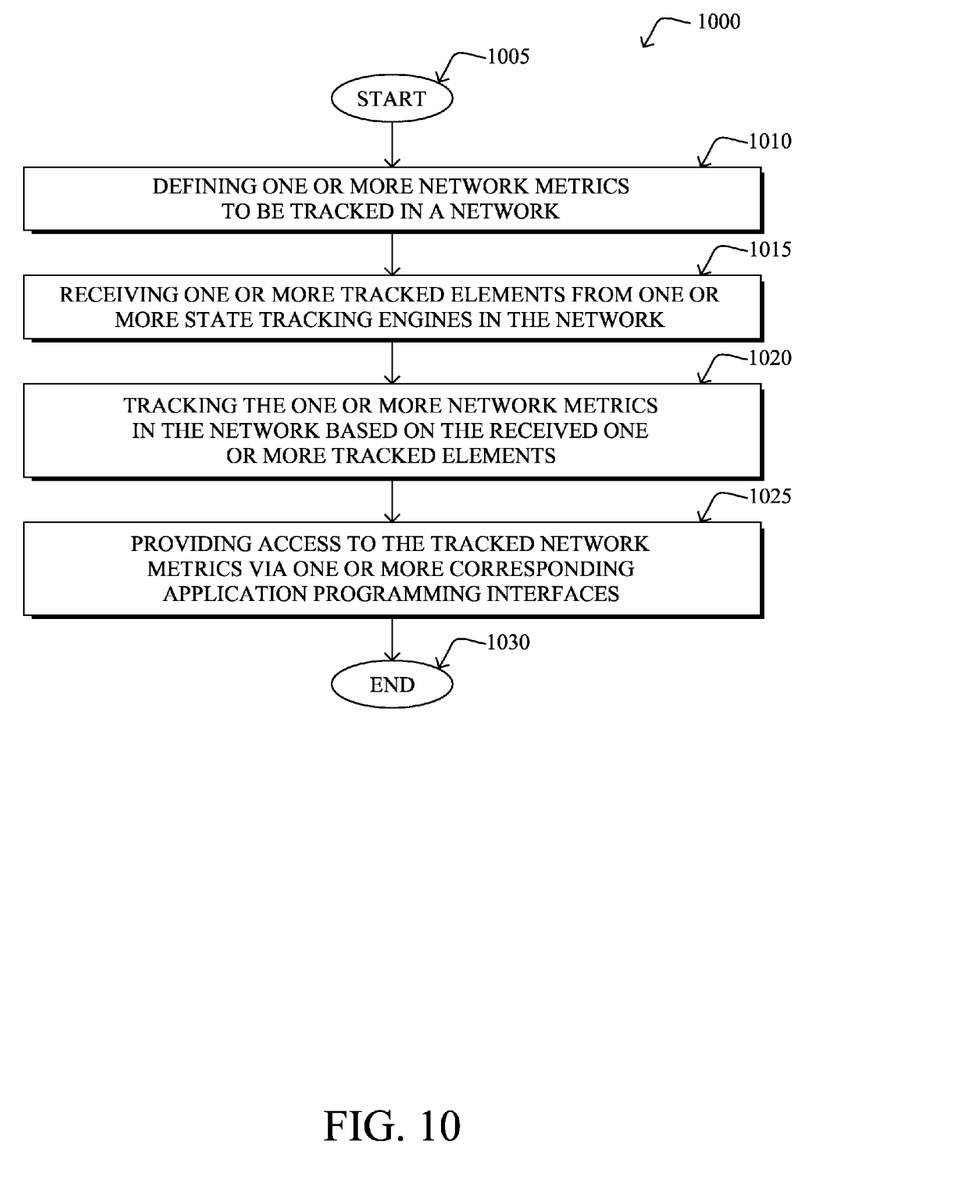
FIG. 10 illustrates an example simplified procedure for an MCE as a pre-processing framework component of distributed intelligence architectures.

FIG. 10 illustrates an example simplified procedure for an MCE as a pre-processing framework component of distributed intelligence architectures. As shown in FIG. 10, the procedure 1000 may start at step 1005, continue to step 1010, and so forth, where, as described in greater detail above, an MCE defines network metrics and tracks the defined network metrics in the network based on tracked elements received from an STE.

At Step 1010, the procedure 1000 includes defining one or more network metrics to be tracked in the network. At Step 1015, one or more tracked elements are received from the STE. At Step 1020, the one or more network metrics are tracked in the network based on the received one or more tracked elements. At Step 1025, access to the tracked network metrics is then provided via one or more corresponding APIs. The procedure 1000 illustratively ends at Step 1030. The techniques by which the steps of procedure 1000 are performed, as well as ancillary procedures, are described in detail above.

It should be understood that the steps shown in FIGS. 9 and 10 are merely examples for illustration, and certain steps may be included or excluded as desired. Further, while a particular order of the steps is shown, this ordering is merely illustrative, and any suitable arrangement of the steps may be utilized without departing from the scope of the embodiments herein. Moreover, while the procedures 900 and 1000 are described separately, certain steps from each procedure may be incorporated into each other procedure, and the procedures are not meant to be mutually exclusive.

The techniques described herein, therefore, provide for a pre-processing framework component of distributed intelligence architectures. In particular, the techniques herein allow an end user to track complex system performance metrics easily, where clients can track what they find useful (i.e., different metrics matter to different networks: some are useful in one but useless in others and the end users have the ability to decide). Also, the techniques herein allow the deployment of distributed intelligence mechanism to any user based on metrics they have designed themselves, and expand performance tracking in the complex IoT space.

While there have been shown and described illustrative embodiments that provide for a pre-processing framework component of distributed intelligence architectures, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

selectively defining, at a state tracking engine (STE) of a network device, one or more classes of elements to track in a network based on at least network relevancy, the elements relating to one or more of: system states, control traffic properties, and application traffic properties;

selectively determining a set of elements to track by the STE, the set of elements selected from the one or more classes based on which elements are relevant to the network device and policy considerations;
tracking, by the STE, the set of elements in the network; and
providing, by the STE, access to the tracked set of elements via one or more corresponding application programming interfaces (APIs); and
sending, from the STE, one or more tracked elements to a metric computation engine (MCE) to track one or more network metrics in the network based on the one or more tracked elements, combine one or more generic variables and one or more statistical functions with one or more classes of elements that can be tracked in the network from the one or more STEs to create a new network metric and generate a new API to track the new network metric in the network.

2. The method according to claim 1, wherein the one or more classes relate to one or more of: routing, an application, security, and a link layer.

3. The method according to claim 2, wherein the routing class includes elements relating to one or more of: protocol type, packet type, a traffic statistic, an IP address, type-length-value (TLV) data, and a flag.

4. The method according to claim 2, wherein the application class includes elements relating to one or more of: a port number, a traffic statistic, and a transport protocol used in the network.

5. The method according to claim 1, further comprising:
observing an undefined property in the network that does not correspond to any of the defined elements; and
tracking the undefined property in the network.

6. The method according to claim 5, further comprising:
requesting classification of the undefined property; and
providing access to the tracked undefined property via a corresponding API.

7. The method according to claim 1, further comprising:
restricting the tracking of the set of elements to one or more specified classes or one or more specified elements.

8. The method according to claim 7, further comprising:
receiving a message specifying the one or more specified classes or the one or more specified elements from a field area router (FAR), a centralized management node, a learning machine, or a user.

9. The method according to claim 1, further comprising:
pushing the tracking of the set of elements to one or more distributed nodes in the network.

10. The method according to claim 9, further comprising:
receiving aggregated tracked elements from the one or more distributed nodes.

11. The method according to claim 9, further comprising:
receiving locally averaged tracked elements from the one or more distributed nodes.

12. The method according to claim 1, further comprising:
sending the tracked set of elements to a storage database.

13. A method, comprising:
selectively defining, by a metric computation engine (MCE) executing on a network device, one or more network metrics to be tracked at a pre-processing layer in a network based on at least network relevancy;
receiving, at the MCE, one or more tracked elements from one or more state tracking engines (STEs) in the network;
tracking, by the MCE, the one or more network metrics in the network based on the received one or more tracked elements;
providing, by the MCE, access to the tracked network metrics via one or more corresponding application programming interfaces (APIs);
combining, by the MCE, one or more generic variables and one or more statistical functions with one or more classes of elements that can be tracked in the network from the one or more STEs to create a new network metric; and
dynamically generating, on the fly, a new API to track the new network metric in the network.

14. The method according to claim 13, wherein:
the one or more generic variables include one or more of: time, number, and rate, and
the one or more statistical functions include one or more of average, variance, and frequency.

15. The method according to claim 13, further comprising:
preventing unauthorized access to a particular network metric.

16. The method according to claim 13, further comprising:
providing access to a particular network metric to an application or a user.

17. A system, comprising:
a first processor configured to execute one or more STEs on a pre-processing layer, the STE configured to:
selectively define one or more classes of elements to track in a network based on at least network relevancy, the elements relating to one or more of: system states, control traffic properties, and application traffic properties,
selectively determine a set of elements to track from the one or more classes based on which elements are relevant the network and policy considerations,
track the set of elements in the network, and
provide access to the tracked set of elements via one or more corresponding application programming interfaces (APIs); and
a second processor configured to execute an MCE at a pre-processing layer, the MCE configured to:
define one or more network metrics to be tracked in the network,
receive one or more tracked elements from the one or more STEs in the network,
track the one or more network metrics in the network based on the received one or more tracked elements,
provide access to the tracked network metrics via one or more corresponding APIs;
combining one or more generic variables and one or more statistical functions with one or more classes of elements that can be tracked in the network from the one or more STEs to create a new network metric; and
dynamically generating, on the fly, a new API to track the new network metric in the network.

18. The system according to claim 17, further comprising:
nodes in the network configured to track the set of elements and send the tracked elements to the STE.

19. The system according to claim 18, wherein the nodes are further configured to aggregate the tracked elements.

20. The system according to claim 18, wherein the nodes are further configured to locally average the tracked elements.

21. An apparatus, comprising:
one or more network interfaces that communicate with a network;

a processor coupled to the one or more network interfaces and configured to execute a process; and a memory configured to store program instructions which contain the process executable by the processor, the process comprising:

selectively defining, at an state tracking engine (STE) executing on the processor, one or more classes of elements to track in a network based on at least network relevancy, the elements relating to one or more of: system states, control traffic properties, and application traffic properties;

selectively determining a set of elements by the STE to track from the one or more classes based on which elements are relevant the network and policy considerations;

tracking the set of elements in the network;

providing access to the tracked set of elements via one or more corresponding application programming interfaces (APIs); and     sending, from the STE, one or more tracked elements to a metric computation engine (MCE) to track one or more network metrics in the network based on the one or more tracked elements, combine one or more generic variables and one or more statistical functions with one or more classes of elements that can be tracked in the network from the one or more STEs to create a new network metric and generate a new API to track the new network metric in the network.

22. An apparatus, comprising:

one or more network interfaces that communicate with a network;

a processor coupled to the one or more network interfaces and configured to execute a metric computation engine (MCE) process; and a memory configured to store program instructions which contain the process executable by the processor, the process comprising:

selectively defining one or more network metrics to be tracked at a pre-processing layer in the network based on at least network relevancy;

receiving one or more tracked elements from one or more STEs in the network;

tracking the one or more network metrics in the network based on the received one or more tracked elements;

providing access to the tracked network metrics via one or more corresponding application programming interfaces (APIs); and     combining one or more generic variables and one or more statistical functions with one or more classes of elements that can be tracked in the network from the one or more STEs to create a new network metric; and     dynamically generating, on the fly, a new API to track the new network metric in the network.

\* \* \* \* \*